United States Patent
Lee et al.

(10) Patent No.: US 11,965,051 B2
(45) Date of Patent: Apr. 23, 2024

(54) SYMMETRICAL POLYOLEFIN BLOCK COPOLYMER AND PREPARATION METHOD THEREFOR

(71) Applicant: AJOU UNIVERSITY INDUSTRY-ACADEMIC COOPERATION FOUNDATION, Suwon-si (KR)

(72) Inventors: Bun Yeoul Lee, Suwon-si (KR); Sung Dong Kim, Suwon-si (KR); Su Jin Gwon, Seongnam-si (KR); Tae Hee Kim, Bucheon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 849 days.

(21) Appl. No.: 16/977,943

(22) PCT Filed: Dec. 21, 2018

(86) PCT No.: PCT/KR2018/016463
§ 371 (c)(1),
(2) Date: Sep. 3, 2020

(87) PCT Pub. No.: WO2019/172512
PCT Pub. Date: Sep. 12, 2019

(65) Prior Publication Data
US 2021/0371570 A1    Dec. 2, 2021

(30) Foreign Application Priority Data
Mar. 6, 2018 (KR) .................. 10-2018-0026543

(51) Int. Cl.
*C08F 297/08* (2006.01)
*C08F 2/06* (2006.01)
(Continued)

(52) U.S. Cl.
CPC ............ *C08F 297/086* (2013.01); *C08F 2/06* (2013.01); *C08F 2/38* (2013.01); *C08F 4/34* (2013.01);
(Continued)

(58) Field of Classification Search
None
See application file for complete search history.

(56) References Cited

U.S. PATENT DOCUMENTS

| 3,949,016 A | 4/1976 | Agouri et al. |
| 2011/0028654 A1* | 2/2011 | Sita .................. C08F 10/02 526/170 |

(Continued)

FOREIGN PATENT DOCUMENTS

| GB | 876093 A | * 10/1956 |
| JP | 48-008891 A | 2/1973 |

(Continued)

OTHER PUBLICATIONS

First Office Action dated Sep. 7, 2022 from the China National Intellectual Property Administration in CN Application No. 201880090792.2.
(Continued)

*Primary Examiner* — Randy P Gulakowski
*Assistant Examiner* — Ha S Nguyen
(74) *Attorney, Agent, or Firm* — Sughrue Mion, PLLC (57) ABSTRACT

The present invention relates to a method for preparing a polyolefin block copolymer, the method comprising: a first step of coordination polymerization of an olefin monomer with a transition metal catalyst in the presence of organozinc; and a second step of continuously adding a diacyl peroxide compound to perform polymerization, and to a polyolefin block copolymer prepared therefrom.

6 Claims, 3 Drawing Sheets

(51) Int. Cl.
    *C08F 2/38*     (2006.01)
    *C08F 4/34*     (2006.01)
    *C08F 4/50*     (2006.01)
    *C08F 4/619*     (2006.01)
    *C08F 4/659*     (2006.01)
    *C08F 110/06*     (2006.01)
    *C08F 210/16*     (2006.01)

(52) U.S. Cl.
    CPC .............. *C08F 4/50* (2013.01); *C08F 110/06* (2013.01); *C08F 210/16* (2013.01); *C08F 2410/01* (2013.01)

(56) References Cited

U.S. PATENT DOCUMENTS

| | | | |
|---|---|---|---|
| 2013/0109900 A1 | 5/2013 | Sita et al. | |
| 2019/0300631 A1* | 10/2019 | Coates | C08F 4/76 |

FOREIGN PATENT DOCUMENTS

| | | | | |
|---|---|---|---|---|
| JP | 2011-503289 A | 1/2011 | | |
| JP | 2011-520006 A | 7/2011 | | |
| JP | 2013-516525 A | 5/2013 | | |
| JP | 2014-196421 A | 10/2014 | | |
| JP | 2018-505945 A | 3/2018 | | |
| KR | 10-2016-0098968 A | 8/2016 | | |
| KR | 10-2017-0107990 A | 9/2017 | | |
| WO | 2009/061499 A1 | 5/2009 | | |
| WO | 2011/147574 A2 | 12/2011 | | |
| WO | 2017/205774 A1 | 11/2017 | | |
| WO | WO-2017205774 A1 * | 11/2017 | ............. | B32B 27/08 |

OTHER PUBLICATIONS

Office Action dated Jul. 27, 2021 in Japanese Application No. 2020-546094.

Andreia Valente et al., "Coordinative Chain Transfer Polymerization", Chemical Reviews, Feb. 7, 2013, vol. 113, No. 5.

Martin Van Meurs et al., "Polyethylene Chain Growth on Zinc Catalyzed by Olefin Polymerization Catalysts: A Comparative Investigation of Highly Active Catalyst Systems across the Transition Series", J. Am. Chem. Soc., 2005, 1 pg., vol. 127.

Daniel J. Arriola et al., "Catalytic Production of Olefin Block Copolymers via Chain Shuttling Polymerization", Science, May 5, 2006, 2 pgs., vol. 312.

Phillip D. Hustad et al., "Continuous Production of Ethylene-Based Diblock Copolymers Using Coordinative Chain Transfer Polymerization", Macromolecules, Oct. 2, 2007, 1pg., vol. 40, No. 20.

P. Prabhu et al., "Synthesis and Properties of ABA Propylene-Ethylene Block Copolymers", Journal of Polymer Science: Polymer Chemistry, 1981, pp. 523-537, vol. 19.

Chung Sol Kim et al., "Polystyrene Chain Growth from Di-End-Functional Polyolefins for Polystyrene Polyolefin-Polystyrene Block Copolymers", Polymers, Oct. 2, 2017, pp. 1-14, vol. 9, No. 481.

Sung Dong Kim et al., "Peroxide-Mediated Alkyl-Alkyl Coupling of Dialkylzinc: A Useful Tool for Synthesis of ABA-Type Olefin Triblock Copolymers", Macromolecules, Jun. 25, 2018, pp. 4821-4828, vol. 51, No. 13.

International Search Report for PCT/KR2018/016463 dated, Apr. 11, 2019 (PCT/ISA/210).

Communication dated Mar. 26, 2021 from the European Search Report for Application No. 18908413.0.

Edson Joseph B. et al., "Fluorinated Bis(phenoxyketimine)titanium Complexes for the Living, Isoselective Polymerization of Propylene: Multiblock Isotactic Polypropylene Copolymers via Sequential Monomer Addition", Journal of the American Chemical Society, vol. 130, No. 14, Mar. 18, 2008, pp. 4968-4977, XP055785959.

Yuan J C et al., "Living and block polymerization of α-olefins using a Ni(II)-α-diimine catalyst containing OSiPh$_2$$^t$Bu groups", Polymer, Elsevier Science Publishers B.V, vol. 46, No. 7, Mar. 10, 2005, pp. 2122-2132, XP027728014.

* cited by examiner

SYMMETRICAL POLYOLEFIN BLOCK COPOLYMER AND PREPARATION METHOD THEREFOR

CROSS REFERENCE TO RELATED APPLICATIONS

This application is a National Stage of International Application No. PCT/KR2018/016463 filed on Dec. 21, 2018, claiming priority based on Korean Patent Application No. 10-2018-0026543 filed Mar. 6, 2018, the entire disclosures of which are incorporated herein by reference.

TECHNICAL FIELD

The present invention relates to a symmetrical polyolefin block copolymer and a method of preparing the same.

BACKGROUND ART

In production of polyolefin block copolymers, coordinative chain transfer polymerization (CCTP) technology in which diethylzinc is used as a chain transfer agent together with a homogeneous catalyst to precisely control the structure of a polyolefin polymer chain is widely used academically and industrially.

In typical CCTP methods, upon olefin polymerization with a catalyst, fast and reversible alkyl group exchange is allowed to occur between a central metal and metallic zinc without occurrence of chain termination due to β-elimination from the catalyst, thereby allowing growth of a polyolefin chain from the metallic zinc (Non-Patent Documents 1 and 2).

Recently, there has been proposed a CCTP method in which an Hf catalyst having good α-olefin copolymerization properties and a Zr catalyst not having such properties are simultaneously introduced in the presence of diethyl zinc as a chain transfer agent to perform ethylene/α-olefin copolymerization, thereby preparing a multi-block copolymer that is composed of a block having high α-olefin content and thus low crystallinity and a block having low α-olefin content and thus high crystallinity (Non-Patent Document 3).

As another method, there has been reported a technique in which, in the presence of diethyl zinc and one catalyst, ethylene and α-olefin are successively introduced into a reactor while varying the compositions thereof, thereby preparing a di-block copolymer composed of a block having a high α-olefin content and a block having a low α-olefin content (Non-Patent Document 4).

However, such known CCTP techniques are limited to formation of a polyolefin chain having an ethyl group at one end thereof and zinc at the other end thereof or formation of an asymmetrical di-block, and thus have difficulty in producing various types of polyolefin polymers.

Accordingly, recent studies are focused on overcoming such a problem in the related art, that is, a limitation in controlling various polyolefin chain structures, to provide industrially useful olefin compounds. However, it is actually not easy to stably provide various new types of olefin compounds.

Non-Patent Document 1: Chemical Reviews 2013, 113, 3836
Non-Patent Document 2: Journal of the American Chemical Society 2005, 127, 9913
Non-Patent Document 3: Science 2006, 312, 714
Non-Patent Document 4: Macromolecules 2007, 40, 7061
Non-Patent Document 5: Journal of Polymer Science: Polymer Chemistry Edition, 1981, 19, 523-537.

DISCLOSURE

Technical Problem

It is one aspect of the present invention to provide a symmetrical polyolefin block copolymer which is commercially useful and is suitable for having thermoplastic elastomeric properties.

It is another aspect of the present invention to provide a method of preparing the symmetrical polyolefin block copolymer, which is advantageous in controlling the composition and length of each polyolefin block and has economical and commercial advantages due to a simple process and high production efficiency thereof.

The above and other aspects of the present invention will become apparent from the detailed description of the following embodiments.

Technical Solution

One aspect of the present invention relates to a method of preparing a polyolefin block copolymer represented by Formula 1, the method including: the first step in which a compound represented by Formula A is prepared by coordination polymerization of an olefin monomer using a transition metal catalyst in the presence of an organozinc compound represented by Formula A-1; and the second step in which a compound represented by Formula B-1 is added to and reacted with the compound represented by Formula A.

$(R^1)_2Zn$  [Formula A-1]

[Formula A]

$R^5C(O)O—OC(O)R^5$  [Formula B-1]

[Formula 1]

wherein Formula A-1, Formula A, Formula B-1 and Formula 1, $R^1$ and $R^5$ are each independently a $C_1$ to $C_{20}$ hydrocarbyl group; $R^2$ to $R^4$ are each independently one selected from among hydrogen, a methyl group, an ethyl group, a butyl group, and a hexyl group; p and 1-p are mole fractions of sub-repeat units constituting a repeat unit b, respectively, p being greater than 0 and less than 1; a ranges from 50 to 5,000 on average or is 0; and b ranges from 50 to 5,000 on average.

In one embodiment, the olefin monomer may include at least two selected from among ethylene, propylene, 1-butene, 1-hexene, and 1-octene.

In one embodiment, the first step may include: introducing one selected from among ethylene, propylene, 1-butene, 1-hexene, and 1-octene as a first olefin monomer; and introducing the transition metal catalyst, followed by further introducing a mixture of at least two selected from among ethylene, propylene, 1-butene, 1-hexene, and 1-octene as a second olefin monomer.

In one embodiment, the first olefin monomer may be one selected from among ethylene, propylene, 1-butene, 1-hexene, and 1-octene, and the second olefin monomer may be a mixture of ethylene and one selected from among propylene, 1-butene, 1-hexene, and 1-octene.

In one embodiment, the first olefin monomer may be propylene and the second olefin monomer may be a mixture of propylene and ethylene.

In one embodiment, a mole ratio of the organozinc compound represented by Formula A-1 to the compound represented by Formula B-1 may range from 1:1 to 1:1.5.

Another aspect of the present invention relates to a symmetrical polyolefin block copolymer represented by Formula 1, the symmetrical polyolefin block copolymer containing a zinc compound represented by Formula B, wherein the zinc content of the symmetrical polyolefin block copolymer is less than or equal to [66/(number average molecular weight of the copolymer represented by Formula 1)]×10$^6$ ppm.

$$(R^5CO_2)_2Zn \quad \text{[Formula B]}$$

[Formula 1]

where Formula B and Formula 1, $R^1$ and $R^5$ are each independently a $C_1$ to $C_{20}$ hydrocarbyl group; $R^2$ to $R^4$ are each independently one selected from among hydrogen, a methyl group, an ethyl group, a butyl group, and a hexyl group; p and 1-p are mole fractions of sub-repeat units constituting a repeat unit b, respectively, p being greater than 0 and less than 1; a ranges from 50 to 5,000 on average or is 0; and b ranges from 50 to 5,000 on average.

A further aspect of the present invention relates to a symmetrical polyolefin block copolymer represented by Formula 1:

[Formula 1]

wherein Formula 1, $R^1$s are each independently a $C_1$ to $C_{20}$ hydrocarbyl group; $R^2$ to $R^4$ are each independently one selected from among hydrogen, a methyl group, an ethyl group, a butyl group, and a hexyl group; p and 1-p are mole fractions of sub-repeat units constituting a repeat unit b, respectively, p being greater than 0 and less than 1; a ranges from 50 to 5,000 on average or is 0; and b ranges from 50 to 5,000 on average.

In one embodiment, a in Formula 1 may be 0.

In one embodiment, a in Formula 1 may not be 0 and may range from 50 to 5,000 on average.

In one embodiment, in Formula 1, $R^4$ and $R^3$ may each be hydrogen and $R^2$ may be one selected from among a methyl group, an ethyl group, a butyl group, and a hexyl group.

In one embodiment, in Formula 1, $R^4$ and $R^3$ may each be a methyl group and $R^2$ may be hydrogen.

Advantageous Effects

The present invention provides: a symmetrical polyolefin block copolymer which is commercially useful and is suitable for having thermoplastic elastomeric properties; and a method of preparing the symmetrical polyolefin block copolymer, which is advantageous in controlling the composition and length of each polyolefin block and has economical and commercial advantages due to a simple process and high production efficiency thereof.

BEST MODE

In formulas described herein, each alphabet denotes corresponding chemical elements, unless otherwise indicated, and Me, Et, Bu, PO, PE, and PP denote methyl, ethyl, butyl, polyolefin, polyethylene, and polypropylene, respectively.

Herein, the term "polymer" may refer to any of an oligomer, a homopolymer, and a copolymer, unless otherwise indicated.

In formulas described herein, the symbol "*" denotes a binding site.

Method of Preparing Symmetrical Polyolefin Block Copolymer

One embodiment of the present invention relates to a method of preparing a polyolefin block copolymer represented by Formula 1.

[Formula 1]

wherein Formula 1, $R^1$ is a $C_1$ to $C_{20}$ hydrocarbyl group; $R^2$ to $R^4$ are each independently one selected from among hydrogen, a methyl group, an ethyl group, a butyl group, and a hexyl group; p and 1-p are mole fractions of sub-repeat units constituting a repeat unit b, respectively, p being greater than 0 and less than 1; a ranges from 50 to 5,000 on average or is 0; and b ranges from 50 to 5,000 on average.

The method of preparing the polyolefin block copolymer according to the present invention includes: the first step in which a compound represented by Formula A is prepared by coordination polymerization of an olefin monomer using a transition metal catalyst in the presence of an organozine compound represented by Formula A-1; and the second step in which a compound represented by Formula B-1 is added to and reacted with the compound represented by Formula A.

$(R^1)_2Zn$ [Formula A-1]

[Formula A]

$R^5C(O)O\text{—}OC(O)R^5$ [Formula B-1]

wherein Formula A-1, Formula A and Formula B-1, $R^1$ and $R^5$ are each independently a $C_1$ to $C_{20}$ hydrocarbyl group; $R^2$ to $R^4$ are each independently one selected from among hydrogen, a methyl group, an ethyl group, a butyl group, and a hexyl group; p and 1-p are mole fractions of sub-repeat units constituting a repeat unit b, respectively, p being greater than 0 and less than 1; a ranges from 50 to 5,000 on average or is 0; and b ranges from 50 to 5,000 on average.

In this way, the present invention provides: a symmetrical polyolefin block copolymer which is commercially useful and is suitable for having thermoplastic elastomeric properties; and a method of preparing the symmetrical polyolefin block copolymer, which is advantageous in controlling the composition and length of a polyolefin block and has economic and commercial advantages due to a simple process and high production efficiency thereof.

Specifically, in the first step, a zinc compound having a structure in which two polyolefin chains are symmetrically attached to opposite sides of a zinc atom, as represented by in Formula A, is prepared through a typical coordinative chain transfer polymerization (CCTP) technique. Then, in the second step, the zinc compound prepared in the first step is reacted with a diacyl peroxide compound represented by Formula B-1, thereby forming a thermodynamically stable zinc carboxylate compound through homolytic cleavage of an oxygen-oxygen single bond of diacyl peroxide while forming a $C(sp^3)\text{-}C(sp^3)$ bond between the two polyolefin chains.

Through these successive reactions in the first and second steps, the present invention provides the polyolefin block copolymer represented by Formula 1, which has a specific symmetrical structure.

In addition, the method of preparing the polyolefin block copolymer according to the present invention is advantageous in using one or more types of olefin monomers as a reactant and is further advantageous in using two or more types of olefin monomers as a reactant, thereby allowing easy control over the composition and length of each polyolefin block.

Further, the method of preparing the polyolefin block copolymer according to the present invention can produce various types of useful symmetrical polyolefin block copolymers by varying reaction conditions, such as the time at which, the order in which, the method by which, and the amounts by which the olefin monomers are introduced, and the method by which the olefin monomers are polymerized.

For example, the method of preparing the polyolefin block copolymer according to the present invention can allow the fraction (mole fraction) of each repeat unit to gradually increase or decrease from an outer portion (terminal) of a polyolefin chain toward an inner portion (center) of the polyolefin chain by varying the introduction amount of each olefin monomer with time, thereby allowing preparation of a symmetrical polyolefin block copolymer in the form of a gradient copolymer in which there is a continuous change in ethylene composition along the polymer chain.

First Step

In the first step, the compound represented by Formula A is prepared by coordination polymerization of an olefin monomer as a reactant using the transition metal catalyst in the presence of the organozinc compound represented by Formula A-1.

Specifically, the olefin monomer may be a $C_1$ to $C_{20}$ α-olefin. More specifically, the olefin monomer may include, for example, ethylene, propylene, 1-butene, 1-hexene, 1-octene, or a mixture thereof. These olefin monomers may be used alone or in combination thereof.

More specifically, the olefin monomer may include at least two selected from among ethylene, propylene, 1-butene, 1-hexene and 1-octene. In this way, a wider variety of symmetrical polyolefin block copolymers can be prepared by varying reaction conditions, such as the time at which, the order in which, the method by which, and the amounts by which olefin monomers are introduced and the method by which olefin monomers are polymerized.

When a combination of two or more types of olefin monomers is used as the olefin monomer, a first olefin monomer and a second olefin monomer may be introduced with a predetermined time interval therebetween or in a predetermined order. For example, the first olefin monomer and the second olefin monomer may be successively introduced in the first step. Alternatively, the first olefin monomer may be introduced early before reaction in the first step and the second olefin monomer may be introduced after addition of the transition metal catalyst. That is, the time at which and the order in which the first and second olefin monomers are introduced can be adjusted in various ways.

In addition, each olefin monomer may be introduced in a constant amount or at a constant ratio throughout the reaction process or may be introduced in a gradually varying amount or at a gradually varying ratio with time.

In one embodiment, the first step may include: introducing one selected from among ethylene, propylene, 1-butene, 1-hexene, and 1-octene as the first olefin monomer; and adding the transition metal catalyst, followed by further introducing a mixture of at least two selected from among ethylene, propylene, 1-butene, 1-hexene, and 1-octene as the second olefin monomer.

In another embodiment, the first step may include: introducing one selected from among ethylene, propylene, 1-butene, 1-hexene, and 1-octene as the first olefin monomer; and adding the transition metal catalyst, followed by further introducing a mixture of ethylene and one selected from among propylene, 1-butene, 1-hexene, and 1-octene as the second olefin monomer.

In a further embodiment, the first step may include: introducing ethylene as the first olefin monomer; and adding the transition metal catalyst, followed by further introducing a mixture of ethylene and one selected from among propylene, 1-butene, 1-hexene, and 1-octene as the second olefin monomer. In this way, it is possible to produce a polyolefin block copolymer which exhibits further improved thermoplastic elastomeric properties and thus is more commercially useful.

In yet another embodiment, the first step may include: introducing propylene as the first olefin monomer; and adding the transition metal catalyst, followed by further introducing a mixture of propylene and one selected from among ethylene, 1-butene, 1-hexene, and 1-octene as the second olefin monomer. In this way, it is possible to produce a polyolefin block copolymer which exhibits further improved thermoplastic elastomer properties and thus is more commercially useful.

In yet another embodiment, the first step may include: introducing propylene as the first olefin monomer; and adding the transition metal catalyst, followed by further introducing a mixture of propylene and ethylene as the second olefin monomer. In this way, it is possible to produce a polyolefin block copolymer that exhibits further improved thermoplastic elastomer properties and thus is more commercially useful.

In the first step, the organozinc compound represented by Formula A-1 has a structure in which an $R^1$ group is attached to both ends of a zinc atom.

$$(R^1)_2 Zn \qquad \text{[Formula A-1]}$$

wherein Formula A-1, $R^1$ is a $C_1$ to $C_{20}$ hydrocarbyl group.

Specifically, $R^1$ may be one selected from among a substituted or unsubstituted $C_1$ to $C_{20}$ methyl group, a substituted or unsubstituted $C_2$ to $C_{20}$ ethyl group, a substituted or unsubstituted $C_6$ to $C_{20}$ hexyl group, a substituted or unsubstituted $C_6$ to $C_{20}$ phenyl group, and a substituted or unsubstituted $C_6$ to $C_{20}$ benzyl group. In this way, the upper limit of pressure requirements for polymerization reaction in the first step can be reduced while improving stability of the reaction.

Specifically, the organozinc compound represented by Formula A-1 may be a dimethyl zinc, diethyl zinc, dihexyl zinc, diphenyl zinc, or dibenzyl zinc compound. These compounds can further improve mass productivity due to easy availability on the market and can further improve stability of the reaction.

Although not particularly limited, the transition metal catalyst used in the first step may generally include: a homogeneous (metallocene) catalyst including a transition metal catalyst as a main catalyst and/or an organoaluminum or boron compound as a co-catalyst; or a non-homogeneous Ziegler catalyst.

In one embodiment, the homogeneous catalyst is preferably used as the transition metal catalyst due to better catalytic activity thereof.

Specifically, the transition metal catalyst may include a compound represented by Formula A-2.

[Formula A-2]

When the compound represented by Formula A-2 is used as the transition metal catalyst in the first step, it is possible to prevent an β-elimination process, thereby allowing a uniform polyolefin chain to be grown from the organozinc compound represented by Formula A-1 with higher efficiency.

More specifically, the transition metal catalyst may be activated using $[Z]^+[B(C_6F_5)_4]^-$ ($[Z]^+$ being $[(C_{18}H_{37})_2N(Me)H]^+$, $[C_6H_5N(Me)_2H]^+$, or $[Ph_3C]^+$) or methyl aluminoxane (MAO) as the co-catalyst. When $[Z]^+[B(C_6F_5)_4]^-$ is used as the co-catalyst, $R_3Al$ (R being Me, Et, iso-Bu, or Octyl) may be further added to remove catalyst poisons remaining in a reaction system, such as water and oxygen.

The first step may be performed, for example, in a homogeneous solution phase. Here, a hydrocarbon solvent or the olefin monomer itself may be used as a dissolving medium. The hydrocarbon solvent may include, for example, $C_4$ to $C_{20}$ aliphatic hydrocarbon solvents, specifically, isobutane, hexane, cyclohexane, methyl cyclohexane, and the like. These solvents may be used alone or as a mixture thereof.

In the first step, the polymerization temperature may be changed depending on the type of reactant and reaction conditions. Specifically, in the first step, polymerization may be performed at a temperature of 50° C. to 170° C. Within this range, the catalyst is thermally stable and solubility of polymer can be improved.

In the first step, polymerization may be carried out through a batch process, a continuous process, or a semi-continuous process. In addition, polymerization in the first step may be carried out in two or more stages having different reaction conditions.

The compound represented by Formula A, which is prepared in the first step, serves as a precursor that forms the symmetrical polyolefin block copolymer represented by Formula 1 through reaction with the diacyl peroxide compound represented by Formula B-1 in the second step.

[Formula A]

wherein Formula A, $R_1$ is a $C_1$ to $C_{20}$ hydrocarbyl group; $R_2$ to $R_4$ are each independently one selected from among hydrogen, a methyl group, an ethyl group, a butyl group, and a hexyl group; p and 1-p are mole fractions of sub-repeat units constituting the repeat unit b, respectively, p being greater than 0 and less than 1; a ranges from 50 to 5,000 on average or is 0; and b ranges from 50 to 5,000 on average.

When the organozinc compound of Formula A prepared in the first step is used in the second step to prepare the polyolefin block copolymer represented by Formula 1, the composition, length, and proportion of each polyolefin block of the polyolefin block copolymer can be variously and accurately controlled without limitation, whereby the polyolefin block copolymer can have suitable properties for desired applications.

In one embodiment, in the first step, the organozinc compound of Formula A having a symmetrical structure may be prepared through a process represented by Reaction Equation 1. Reaction Equation 1 represents a reaction in the first step, which is performed by introducing a mixture of $CH_2$=$CH$—$R_3$ and $CH_2$=$CH$—$R_2$ as the olefin monomer.

[Reaction Equation 1]

wherein Reaction Equation 1, a is 0, and $R^1$ to $R^3$, $R^5$, b, and p are the same as described above.

In the repeat unit b formed through the reaction in the first step represented by Reaction Equation 1, the mole fraction p may be a variable that has different values depending on the position on the polyolefin chain by varying the polymerization method, such as the method of introducing the olefin monomer.

In another embodiment, in the first step, $CH_2\!=\!CH\!-\!R^4$ may be further introduced with a time interval with respect to the mixture of $CH_2\!=\!CH\!-\!R^3$ and $CH_2\!=\!CH\!-\!R^2$ as the ethylene monomer in Reaction Equation 1. In this way, it is possible to prepare a polyolefin block copolymer in which a in Formula 1 is not 0. In a further embodiment, in the first step, the mixture of $CH_2\!=\!CH\!-\!R^3$ and $CH_2\!=\!CH\!-\!R^2$ may be introduced while controlling the mole ratio of $CH_2\!=\!CH\!-\!R^3$ and $CH_2\!=\!CH\!-\!R^2$ or the content of each of $CH_2\!=\!CH\!-\!R^2$ and $CH_2\!=\!CH\!-\!R^3$ to vary the p value, thereby allowing preparation of various types of block copolymers. For example, in the first step, the mixture may be introduced while gradually reducing the ratio of $R^2CH\!=\!CH_2$ to $R^3CH\!=\!CH_2$ monomers, thereby preparing a polyolefin block copolymer in the form of a gradient copolymer in which the p value gradually decreases from both end groups of the polyolefin chain toward the center of the polyolefin chain. In this way, the block copolymer represented by Formula 1 can have a symmetrical gradient polymer chain that has a decreasing $R^2CH\!=\!CH_2$ content and an increasing $R^3CH\!=\!CH_2$ content from both end groups thereof toward the center thereof.

Second Step

In the second step, the diacyl peroxide compound represented by Formula B-1 is added to and reacted with the compound represented by Formula A, thereby preparing the polyolefin block copolymer represented by Formula 1.

$R^5C(O)O\!-\!OC(O)R^5$     [Formula B-1]

wherein Formula B-1, $R^5$s are each independently a $C_1$ to $C_{20}$ hydrocarbyl group. Specifically, $R^5$ may be one selected from among a substituted or unsubstituted $C_1$ to $C_{20}$ methyl group, a substituted or unsubstituted $C_2$ to $C_{20}$ ethyl group, a substituted or unsubstituted $C_6$ to $C_{20}$ hexyl group, a substituted or unsubstituted $C_{16}$ to $C_{20}$ phenyl group, and a substituted or unsubstituted $C_6$ to $C_{20}$ benzyl group. In this way, the reaction can be performed more stably.

In the second step, through reaction of the compound containing symmetrical polyolefin chains represented by Formula A with the diacyl peroxide compound, a thermodynamically stable zinc carboxylate compound is formed through homolytic cleavage of an oxygen-oxygen single bond of diacyl peroxide and two polyolefin chains of the organozinc compound are connected to each other via a $C(sp^3)\!-\!C(sp^3)$ bond, whereby the polyolefin block copolymer represented by Formula 1 can be prepared.

With the second step, the present invention allows easy control over the composition and length of each polyolefin block through adjustment of the time at which, the order in which, the method by which, and the amounts by which reactants are introduced and the method by which the reactants are polymerized at the reaction-design stage, while allowing a final product to have a symmetrical structure.

Without the second step, it is difficult to prepare an ABA-type symmetrical tri- or higher-block copolymer as in the present invention. Unlike an ABA-type symmetrical tri-block copolymer, an AB-type asymmetrical bi-block copolymer (for example, polyethylene-block-poly(ethylene-co-propylene) or polypropylene-block-poly(ethylene-co-propylene)) cannot exhibit sufficient thermoplastic elastomeric properties.

In one embodiment, when the transition metal catalyst (for example, a hafnium (Hf) catalyst) and a borate-based co-catalyst (for example, $[Z]^+[B(C_6F_5)_4]^-$) are used in the first step, the transition metal catalyst and the borate-based co-catalyst may be used in smaller amounts than the organozinc compound represented by Formula A-1 not to have significant effects on the reaction in the second step (for example, $[B]/[Hf]\!=\!1$, $[Zn]/[Hf]\!=\!50$).

In another embodiment, when an $R_3Al$ compound is used to remove catalyst poisons or as the co-catalyst in the first step, the amount of the $R_3Al$ compound may be non-negligible (for example, $[Al]/[Zn]\!=\!\frac{1}{3}$), although the amount of the $R_3Al$ compound can be changed depending on the state of a reaction system. In this embodiment, the $R_3Al$ compound can form a complex with the diacyl peroxide compound introduced in the second step or may cause side reactions. In order to solve such a problem, in the second step, $CO_2$ gas may be introduced into a reactor before introduction of the diacyl peroxide compound to selectively destroy the $R_3Al$ compound, thereby suppressing occurrence of side reactions. The $CO_2$ gas reacts with the $R_3Al$ compound without reacting with the organozinc compound represented by Formula A-1. The $CO_2$ gas may be introduced in a gas phase into the reactor at a pressure of, for example, 1 bar to 20 bar. Here, the amounts of the diacyl peroxide compound and the $R_3Al$ compound preferably satisfy "$[R^5C(O)O\!-\!OC(O)R^5]\!=\![Zn]^+[Al]$" to improve reaction efficiency.

In one embodiment, $[Al]/[Zn]$ may have a value of 1 to 0.5. In this embodiment, a mole ratio of the organozinc compound represented by Formula A-1, which is introduced in the first step, and the compound represented by Formula B-1, which is introduced in the second step, may range from 1:1 to 1:1.5.

In the second step, although the reaction temperature can be changed depending on the types of reactants, reaction conditions, and the like, the reaction temperature may range from 50° C. to 170° C. Within this range, the yield of the polyolefin block copolymer represented by Formula 1 can be further improved.

In the second step, reaction may be carried out through a batch process, a continuous process, or a semi-continuous process. In addition, reaction in the second step may be carried out in two or more stages having different reaction conditions.

In the second step, although the reaction time can be changed depending on the types of reactants, reaction conditions, and the like, the reaction time may range from 0.1 to 2 hours, 0.1 to 1 hour, or 0.1 to 0.5 hours.

In one embodiment, in the second step, the symmetrical polyolefin block copolymer represented by Formula 1 may be prepared through a process represented by Reaction Equation 2.

[Reaction Equation 2]

wherein Reaction Equation 2, a is 0 and $R^1$ to $R^3$, $R^5$, b, and p are the same as described above.

As described above, the present invention provides a method of preparing a block copolymer, which allows a polyolefin multi-block copolymer having a ABA-type symmetrical structure as represented by Formula 1 to be prepared by a one-pot synthesis in the second step continuously after olefin polymerization in the first step, thereby allowing reduction in production cost through process simplification and increase in production efficiency, and thus can be easily used in a commercial process.

In addition, the polyolefin block copolymer is not particularly limited so long as the polyolefin block copolymer has a symmetrical structure. For example, the polyolefin block copolymer may include a tri-block copolymer, a penta-block copolymer, a hepta-block copolymer, and the like. In this way, the polyolefin multi-block copolymer can have more favorable elastomeric properties.

Symmetrical Polyolefin Block Copolymer

Another aspect of the present invention relates to a symmetrical polyolefin block copolymer represented by Formula 1 and/or various types of mixtures, polymers, and compositions including the same.

[Formula 1]

wherein Formula 1, R's are each independently a $C_1$ to $C_{20}$ hydrocarbyl group; $R^2$ to $R^4$ are each independently one selected from among hydrogen, a methyl group, an ethyl group, a butyl group, and a hexyl group; p and 1-p are mole fractions of sub-repeat units constituting a repeat unit b, respectively, p being greater than 0 and less than 1; a ranges from 50 to 5,000 on average or is 0; and b ranges from 50 to 5,000 on average.

Herein, the repeat unit a indicated by square brackets ([ ]) refers to a polyolefin repeat unit constituting the polyolefin block copolymer. Similarly, the repeat unit b indicated by square brackets ([ ]) in Formula 1 refers to another polyolefin repeat unit constituting the polyolefin block copolymer. The repeat unit b may be composed of sub-repeat units derived from one or more types of monomers.

Herein, a and b may be used as symbols representing respective repeat units, and, at the same time, may be used as symbols representing the number of repetitions of the respective repeat units. In typical polymer synthesis, each of a and b has a certain distributions rather than a single integer, and thus is calculated by measuring the average thereof. However, a may be 0 in some cases.

Although a lower limit of the average value of each of a and b is not particularly limited, if the average value of each of a and b is less than 50, the output of a polymer can be small relative to the amount of an organozine compound used in production of the polymer, causing reduction in productivity. In addition, if the average value of each of a and b exceeds 5,000, it is difficult to obtain the compound represented by Formula 1 due to excessive increase in viscosity.

The average value of each of a and b in Formula 1 may be adjusted by varying reaction conditions, such as the time at which, the order in which, the method by which, and the amounts by which an olefin monomer and an organozine compound ($(R')_2Zn$) are introduced and the method by which the olefin monomer and the organozinc compound are polymerized. In this way, a wider variety of useful polyolefin multi-block copolymers can be produced.

In Formula 1, p and 1-p denote mole fractions of sub-repeat units constituting the repeat unit b, respectively, wherein p is greater than 0 and less than 1. The present invention allows the repeat unit b including the sub-repeat units (mole fractions: p, 1-p) to be formed using two or more types of olefin monomers as reactants, and thus is particularly useful in preparation of a symmetrical polyolefin block copolymer as represented by Formula 1.

A terminal functional group $R^1$ in Formula 1 is derived from an organic functional group ($R^1$) contained in the organozine compound (($R'$)$_2$Zn) represented by Formula A-1, which is introduced in the first step of the method of preparing the polyolefin block copolymer set forth above.

Specifically, $R^1$ in Formula 1 may be one selected from among a methyl group, an ethyl group, a hexyl group, a phenyl group, and a benzyl group. In this way, the upper limit of pressure requirements for polymerization reaction in the first step can be reduced while improving stability of the reaction.

$R^2$ to $R^4$ in Formula 1 are derived from olefin monomers introduced in the first step of the method of preparing the polyolefin block copolymer set forth above. $R^2$ and $R^3$ may be the same or different, and $R^3$ and $R^4$ may be the same or different.

Specifically, $R^2$ to $R^4$ in Formula 1 may each independently be one selected from among hydrogen, a methyl group, an ethyl group, a butyl group, and a hexyl group, and the types of $R^2$ to $R^4$ may be controlled as desired by adjusting the types of olefin monomers introduced in the first step. In this way, the polyolefin block copolymer can be produced with higher reaction efficiency while having a variety of commercially useful structures.

Specifically, the values of a, b, p, and 1-p in Formula 1 may be controlled by adjusting the amounts or ratio of olefin monomers introduced in the first step. In this way, the polyolefin block copolymer can be produced with higher reaction efficiency while having a variety of commercially useful structures.

In one embodiment, in Formula 1, a may be 0, b may range from 50 to 5,000 on average, and p may be greater than 0 and less than 1. This type of polyolefin multi-block copolymer may have $R^2$ and $R^3$ identical to each other when one type of olefin monomer is used alone in the first step. In addition, this type of polyolefin multi-block copolymer may have $R^2$ and $R^3$ different from each other when a mixture of two types of olefin monomers is introduced in the first step.

In another embodiment, in Formula 1, a may not be 0 and may range from 50 to 5,000 on average. This type of polyolefin multi-block copolymer may be prepared through a process in which the first olefin monomer is introduced and polymerized first in the first step, followed by reacting the first olefin monomer until the monomer is completely depleted or removing the remaining first olefin monomer, and then the second olefin monomer is introduced and polymerized. Here, when one type of olefin monomer is used alone as the second olefin monomer, $R^2$ and $R^3$ may be identical to each other, whereas, when two types of olefin monomers are used as the second olefin monomer, $R^2$ and $R^3$ may be different from each other.

When a mixture of two types of olefin monomers is used as the second olefin monomer, the mole fractions (p, 1-p) of the two olefin monomers in the block b may be controlled through adjustment of the mole ratio thereof.

In a further embodiment, in Formula 1, $R^4$ and $R^3$ may be hydrogen; and $R^2$ may be one selected from among a methyl group, an ethyl group, a butyl group, and a hexyl group. In this embodiment, the block a may be polyethylene and the block b may be poly(ethylene-co-propylene), poly(ethylene-co-1-butene), poly(ethylene-co-1-hexene), or poly(ethylene-co-1-octene). This type of symmetrical polyolefin block copolymer may be prepared by introducing ethylene as the first olefin monomer in the first step, followed by introducing a mixture of ethylene and one selected from among propylene, 1-butene, 1-hexene, and 1-octene as the second olefin monomer.

In yet another embodiment, in Formula 1, $R^4$ and $R^3$ may be a methyl group; and $R^2$ may be one selected from among hydrogen, an ethyl group, a butyl group, and a hexyl group. In this embodiment, the block a may be polypropylene and the block b may be poly(propylene-co-ethylene), poly(propylene-co-1-butene), poly(propylene-co-1-hexene), or poly(propylene-co-1-octene). This type of symmetrical polyolefin block copolymer may be prepared by introducing propylene as the first olefin monomer in the first step, followed by introducing a mixture of propylene and one selected from among ethylene, 1-butene, 1-hexene, and 1-octene as the second olefin monomer.

The polyolefin multi-block copolymer represented by Formula 1 is an ABA-type tri-block copolymer. In particular, when the polyolefin multi-block copolymer has a structure in which the block a at both ends of the copolymer is a crystalline polyethylene chain or polypropylene chain and the block b at the center of the copolymer is non-crystalline poly(ethylene-co-propylene), poly(propylene-co-1-butene), poly(propylene-co-1-hexene), or poly(propylene-co-1-octene) (for example, a structure of polyethylene-block-poly(ethylene-co-propylene)-block-polyethylene or of polypropylene-block-poly(ethylene-co-propylene)-block-polypropylene), the polyolefin multi-block copolymer can exhibit thermoplastic elastomeric properties and thus is highly commercially useful.

The symmetrical polyolefin block copolymer represented by Formula 1 according to the present invention may include a zinc compound represented by Formula B.

$(R^5CO_2)_2Zn$ [Formula B]

where $R^5$ is a $C_1$ to $C_{20}$ hydrocarbyl group.

The zinc compound represented by Formula B may be contained in the form of a composition, polymer, or mixture in the polyolefin block copolymer.

The zinc compound represented by Formula B may satisfy Equation 1.

$[66/([Mn])] \times 10^6$ ppm $\geq C[Zn]$ [Equation 1]

wherein Equation 1, [Mn] denotes a number average molecular weight of the symmetrical polyolefin block copolymer represented by Formula 1, and C[Zn] is the content (ppm) of a zinc atom in the symmetrical polyolefin block copolymer represented by Formula 1.

As described above, the symmetrical polyolefin block copolymer represented by Formula 1 is prepared by performing the first step as represented by Reaction Equation 1, followed by performing the second step in which the resultant of the first step is treated with the diacyl peroxide ($R^5C(O)O$—$OC(O)R^5$) compound to connect two polyolefin chains attached to a zinc atom via a $C(sp^3)$-$C(sp^3)$ bond, as represented by Reaction Equation 2.

In typical CCTP techniques, the organozine compound represented by Formula A is produced as a by-product. However, it is difficult and costs a lot to separate or fractionate the organozine compound represented by Formula A from the block copolymer represented by Formula 1. Generally, the compound represented by Formula A is a non-toxic substance that is widely used as a polymeric additive. The present invention allows the organozinc compound represented by Formula A to be utilized as a polymeric additive without need to be removed or separated from the polyolefin block copolymer prepared using the organozinc compound as a precursor, and thus is economical and desirable.

In the symmetrical polyolefin block copolymer represented by Formula 1 according to the present invention, one polyolefin block copolymer represented by Formula 1 and one $(R^5CO_2)_2Zn$ molecule represented by Formula B are produced per zinc atom, as shown in the Reaction Equation 1 and Reaction Equation 2. Here, the zinc content satisfies Equation 1.

For example, a resin having a zinc content somewhat higher than an ideal zinc content according to Equation 1 may be prepared, considering a situation where the reaction represented by Reaction Equation 2 is not performed with ideal efficiency (that is, formation of a $C(sp^3)$-$C(sp^3)$ bond between two polyolefin chains attached to a zinc atom through treatment with the $R^5C(O)O$—$OC(O)R^5$ compound is not perfect, causing formation of some polymer chains having a lower molecular weight). Alternatively, the zinc content of the block copolymer represented by Formula 1 may be less than or equal to the zinc content according to Equation 1, considering a situation where the $(R^5CO_2)_2Zn$ compound is added as an additive to a resin after preparation of the resin and before release of the resin.

EXAMPLE

Next, the present invention will be described in more detail with reference to examples. However, it should be noted that these examples are provided for illustration only and should not be construed in any way as limiting the invention.

Experimental Example 1: Reaction of a Dialkyl Zinc Compound with a Diacyl Peroxide ($R^4C(O)O$—$OC(O)R^4$) Compound It was confirmed that reaction of a dioctyl zinc compound with a lauroyl peroxide ($CH_3(CH_2)_{10}C(O)O$—$OC(O)$ ($CH_2)_{10}CH_3$) or dibenzoyl peroxide (PhC(O)OOC(O)Ph) compound caused two octyl groups attached to a zinc atom to be connected via a $C(sp^3)$-$C(sp^3)$ bond, causing formation of hexadecane (Reaction Equation 2-1).

[Reaction Equation 2-1]

A dioctyl zinc compound (200 mg, 0.685 mmol) dissolved in methyl cyclohexane (27 g) was introduced into a one-neck flask. After stirring the resulting solution in a constant-temperature bath at 90° C. for 20 minutes, lauroyl peroxide (273 mg, 0.685 mmol) dissolved in methyl cyclohexane (7.25 g) was introduced into the flask, followed by reaction at 90° C. for 1 hour. Throughout the reaction, the solution remained colorless and transparent. Then, the reaction solution was cooled to room temperature, followed by separation of a polar substance and a non-polar hydrocarbon compound from the reaction solution by allowing the reaction solution to pass through a silica column and further using 50 mL of hexane as an eluent. Then, the solvent was completely removed using a rotary evaporator, thereby obtaining only the hydrocarbon compound. The resulting product was identified as hexadecane (114 mg, 73%) using $^1$H NMR and $^{13}$C NMR.

Experimental Example 2: Reaction of a Dioctyl Zinc Compound with a Lauroyl Peroxide ($CH_3$($CH_2)_{10}C(O)O$—$OC(O)(CH_2)_{10}CH_3$) Compound after Bringing the Dioctyl Zinc Compound into Contact with Carbon Dioxide A dioctyl zinc compound (200 mg, 0.685 mmol) dissolved in methyl cyclohexane (27 g) was introduced into a bomb reactor. After stirring the resulting solution in a constant-temperature bath at 90° C. for 20 minutes, $CO_2$ gas (10 bar) was introduced into the reactor, followed by reaction for 15 minutes. After removal of $CO_2$ gas, lauroyl peroxide (273 mg, 0.685 mmol) dissolved in methyl cyclohexane (7.25 g) was introduced into the reactor, followed by reaction at 90° C. for 30 minutes. Then, the reaction solution was cooled to room temperature, followed by separation of a polar substance and a non-polar hydrocarbon compound from the reaction solution by allowing the reaction solution to pass through a silica column and further using 50 mL of hexane as an eluent. Then, the solvent was completely removed using a rotary evaporator, thereby obtaining only the hydrocarbon compound. The resulting product was identified as hexadecane (120 mg, 73%) using $^1$H NMR and $^{13}$C NMR.

Experimental Example 3: Reaction of a Trioctyl Aluminum Compound with a Lauroyl Peroxide ($CH_3$($CH_2)_{10}C(O)O$—$OC(O)(CH_2)_{10}CH_3$) Compound after Brining the Trioctyl Aluminum Compound into Contact with Carbon Dioxide A trioctyl aluminum compound (200 mg, 0.545 mmol) dissolved in methyl cyclohexane (27 g) was introduced into a bomb reactor. After stirring the resulting solution in a constant-temperature bath at 90° C. for 20 minutes, $CO_2$ gas (10 bar) was introduced into the reactor, followed by reaction for 15 minutes. Then, lauroyl peroxide (217 mg, 0.545 mmol) dissolved in methyl cyclohexane (7.25 g) was introduced into the reactor, followed by reaction at 90° C. for 30 minutes. Then, the reaction solution was cooled to room temperature, followed by separation of a polar substance and a non-polar hydrocarbon compound from the reaction solution by allowing the reaction solution to pass through a silica column and further using 50 mL of hexane as an eluent. When the solvent was removed using a rotary evaporator, there was no remaining hydrocarbon compound.

Experimental Example 4: Reaction of a Mixture of a Dioctyl Zinc Compound and a Trioctyl Aluminum Compound with a Lauroyl Peroxide ($CH_3$ ($CH_2)_{10}C(O)O$—$OC(O)(CH_2)_{10}CH_3$) Compound after Brining the Mixture into Contact with Carbon Dioxide A dioctyl zinc compound (100 mg, 0.342 mmol) and a trioctyl aluminum compound (41.5 mg, 0.113 mmol) dissolved in methyl cyclohexane (10 g) was introduced into a bomb reactor. After stirring the resulting solution in a constant-temperature bath at 90° C. for 20 minutes, $CO_2$ gas (10 bar) was introduced into the reactor, followed by reaction for 15 minutes. After removal of $CO_2$ gas, lauroyl peroxide (182 mg, 0.456 mmol) dissolved in methyl cyclohexane (7.12 g) was introduced into the reactor, followed by reaction at 90° C. for 30 minutes. Then, the reaction solution was cooled to room temperature, followed by separation of a polar substance and a non-polar hydrocarbon compound from the reaction solution by allowing the reaction solution to pass through a silica column and further using 50 mL of hexane as an eluent. Then, the solvent was completely removed using a rotary evaporator, thereby obtaining only the hydrocarbon compound. The resulting product was identified as hexadecane (72 mg, 87%) using $^1$H NMR and $^{13}$C NMR.

In Experimental Example 1, it can be seen that addition of a diacyl peroxide (RC(O)O—OC(O)R) compound to a dialkyl zinc compound allows a reaction connecting two alkyl groups attached to an zinc atom through formation of a $C(sp^3)$-$C(sp^3)$ bond to be performed with high efficiency.

Further, in Experimental Examples 2 to 4, it can be seen that, in a situation where trialkyl aluminum used to remove catalyst poisons upon olefin polymerization coexists with a dialkyl zinc compound upon olefin polymerization, introduction of a diacyl peroxide (RC(O)O—OC(O)R) compound in an amount equal to the total number of moles of Zn and Al subsequent to treatment with $CO_2$ allows a reaction connecting two alkyl groups attached to an zinc atom to be performed with high efficiency without interference from trialkyl aluminum.

Example 1: Preparation of an ABA-Type Polyethylene-Block-Poly(Ethylene-Co-Propylene)-Block-Polyethylene Block Copolymer (in Formula 1, $R^3$ and $R^4$ being H, $R^2$ being Me)

First step: A solution of trimethyl aluminum (14.4 mg, 200 μmol-Al) in methyl cyclohexane (17 g) was introduced into a high-pressure reactor (100 mL). The solution in the reactor was purified of catalyst poisons at 100° C. for 1 hour, followed by removal of the solvent using a cannula. Then, vacuum was applied to the high-pressure reactor for 15 minutes to remove the residual solvent and the like, followed by introduction of purified ethylene gas into the reactor to adjust the reactor to atmospheric pressure. A solution of trioctyl aluminum (12 mg, 33 μmol) in methyl cyclohexane (14 g) was introduced into the reactor, followed by heating the reactor to 80° C., and then a solution of a dioctyl zinc compound (29.2 mg, 100 μmol) in methyl cyclohexane (10 g) was introduced into the reactor. Thereafter, a solution obtained by stirring a hafnium compound (2.0 μmol) represented by Formula A-2 and $(C_{18}H_{37})N(Me)H^+[B(C_6F_5)_4]^-$ (2.0 μmol) in benzene for 2 hours was diluted with methyl cyclohexane (1 g) and then introduced into the reactor. Then, purified ethylene gas (5 bar) in a 1.2 L high-pressure tank containing trioctyl aluminum (25% methyl cyclohexane solution, 30 mL) was introduced into the reactor, followed by reaction for 3 minutes. Here, the reactor was maintained at a temperature of 80° C. to 90° C. and the pressure of the reactor decreased to 2 bar in 3 minutes due to exhaustion of ethylene. Then, ethylene/propylene mixed gas in another high-pressure tank (1.2 L) containing trioctyl aluminum (that is, a mixed gas obtained by charging propylene into the tank up to 9 bar, followed by charging into the tank up to 20 bar) was introduced into the reactor. Despite cooling the reactor with a fan, the temperature of the reactor increased to 122° C. in 10 minutes due to exothermic reaction. Thereafter, the reactor was adjusted to a temperature of 100° C. to 110° C. The pressure of the reactor gradually decreased with consumption of the monomers, and finally decreased to 13 bar after reaction for 30 minutes. Then, remaining monomer gas was removed by opening a valve, followed by collecting a small amount of a polymer sample for molecular weight measurement using a thick syringe needle.

Second step: In order to destroy trioctyl aluminum, $CO_2$ gas (10 bar) was introduced into the reactor, followed by reaction for 15 minutes. Here, the reactor was adjusted to a temperature of 105° C. After removal of $CO_2$ gas, lauroyl peroxide (53.0 mg, 133 μmol) dissolved in methyl cyclohexane (7.7 g) was introduced into the reactor. After reaction at a temperature of 105° C. to 110° C. for 30 minutes, the reactor was opened, followed by collecting the resulting polymer, which in turn was dried in a vacuum oven at 180° C. overnight.

Examples 2 to 4

Block copolymers were prepared in the same manner as in Example 1 except that reaction time for ethylene polymerization was changed from 3 minutes to 5 minutes (Example 2), 7 minutes (Example 3), and 9 minutes (Example 4).

Example 5

A block copolymer was prepared in the same manner as in Example 1 except that modified methylaluminoxane (MMAO) (12.7 mg, 7.0 w %-Al, 33 μmol) was used instead of trioctyl aluminum (12 mg, 33 μmol) and reaction time for ethylene polymerization was changed from 3 minutes to 7 minutes.

Results of reactions in Examples 1 to 5 are shown in Table 1.

TABLE 1

| | Yield (g) | PE-block (g) | Poly($C_2$-co-$C_3$) block (g) | Mn (kDa); PDI before treatment with peroxide | Mn (kDa); PDI after treatment with peroxide | Tm (° C.); ΔH (J/g) | Zinc content (PPm) | (66/[Mn]) × $10^6$ |
|---|---|---|---|---|---|---|---|---|
| Example 1 | 14.9 | 1.8 | 13.1 | 40; 2.26 | 70; 1.86 | 123; 34 | 443 | 943 |
| Example 2 | 13.4 | 2.4 | 11.0 | 28; 3.96 | 68; 1.76 | 124; 39 | 493 | 970 |
| Example 3 | 14.8 | 3.4 | 11.4 | 55; 1.84 | 80; 1.68 | 125; 40 | 446 | 825 |
| Example 4 | 14.4 | 4.1 | 10.3 | 34; 3.04 | 65; 1.97 | 126; 56 | 458 | 1020 |
| Example 5 | 10.8 | 3.4 | 7.4 | 40; 1.68 | 71; 1.61 | 125; 40 | 611 | 930 |

Examples 6 to 9: Preparation of an ABA Type Polypropylene-Block-Poly(Ethylene-Co-Propylene)-Block-Polypropylene Tri-Block Copolymer (in Formula 1, $R^4$ and $R^3$ being Me, $R^2$ being H)

Block copolymers were prepared in the same manners as in Examples 1 to 4, respectively, except that, instead of ethylene, propylene was reacted for 3 minutes (Example 6), 5 minutes (Example 7), 7 minutes (Example 8), and 9 minutes (Example 9). Results of polymerization in Examples 6 to 9 are shown in Table 2.

TABLE 2

| | Yield (g) | PP-block (g) | Poly($C_2$-co-$C_3$) block (g) | Mn (kDa); PDI before treatment with peroxide | Mn (kDa); PDI after treatment with peroxide | Tm (° C.); (ΔH) (J/g) | Zinc content (ppm) | (66/[Mn]) × $10^6$ |
|---|---|---|---|---|---|---|---|---|
| Example 6 | 14.8 | 3.4 | 11.4 | 26; 4.04 | 46; 2.99 | 149; 11 | 446 | 1430 |
| Example 7 | 15.1 | 4.5 | 10.6 | 31; 3.01 | 52; 2.59 | 149; 12 | 437 | 1270 |

TABLE 2-continued

| | Yield (g) | PP-block (g) | Poly($C_2$-co-$C_3$) block (g) | Mn (kDa); PDI before treatment with peroxide | Mn (kDa); PDI after treatment with peroxide | Tm (° C.); (ΔH) (J/g) | Zinc content (ppm) | (66/[Mn]) × $10^6$ |
|---|---|---|---|---|---|---|---|---|
| Example 8 | 16.1 | 5.4 | 10.7 | 15; 3.36 | 49; 2.89 | 149; 15 | 410 | 1350 |
| Example 9 | 16.7 | 6.0 | 10.7 | 29; 3.13 | 41; 2.74 | 148; 17 | 395 | 1610 |

Comparative Examples 1 to 4: Preparation of AB-Type Polyethylene-Block-Poly(Ethylene-Co-Propylene) Di-Block Copolymer

Block copolymers were prepared in the same manner as in Examples 1 to 4, respectively, except that lauroyl acid ($CH_3(CH_2)_{10}C(O)OH$) was introduced instead of lauroyl peroxide ($CH_3(CH_2)_{10}C(O)O$—$OC(O)(CH_2)_{10}CH_3$) in the second step. Here, the yields of the block copolymers were 15.4 g (Comparative Example 1), 13.6 g (Comparative Example 2), 12.4 g (Comparative Example 3), and 13.3 g (Comparative Example 4), respectively.

Comparative Examples 5 to 8

A polyethylene-block-poly(ethylene-co-propylene)-block-polyethylene copolymer (Comparative Example 7) or a polypropylene-block-poly(ethylene-co-propylene)-block-polypropylene copolymer (Comparative Example 8) was prepared using living polymerization with a Ziegler-Natta catalyst by successively adding ethylene/ethylene-propylene mixed gas/ethylene (Comparative Example 5) or propylene/ethylene-propylene mixed gas/propylene (Comparative Example 6) to a $TiCl_3$-$Et_2AlCl$ catalyst system without performing the first step in Example 1. Experiments on the prepared copolymers were conducted in the same manner as in Non-Patent Document 5.

Each of the block copolymers prepared in Comparative Examples 5 to 9 had an asymmetrical chain structure represented by Comparative Formula 1, which is different from the chain structure obtained through the first step and the second step (treatment with diacyl peroxide ($R^4C(O)O$—$OC(O)R^4$)) according to the present invention.

[Comparative Formula 1]

$R^2$ = H, $R^3$ = $CH_3$ or $R^2$ = CH3, $R^3$ = H

It is generally known that a homopolymer is inevitably produced together with a block copolymer in preparation of polyolefin block copolymers using a Ziegler-Natta catalyst. In Comparative Examples 5 to 9, a considerable amount of a polyethylene homopolymer was produced. In addition, block copolymerization using living polymerization as in Comparative Examples 5 to 9 allows one polymer chain molecule to be produced per metal atom, causing reduction in amount of a polymer produced per unit weight of a catalyst (4 to 20 g-polymer/g-Ti in Comparative Examples 5 to 9), and thus has limited commercial applicability.

<Evaluation Method>
(1) GPC Data

Each of the polymers prepared in Examples and Comparative Examples was dissolved at a concentration of 3,000 ppm in 1,2,4-trichlorobenzene and was fed into a GPC column and eluted with 1,2,4-trichlorobenzene (including 2,4-di-tert-butyl-4-methylphenol (0.04%) as an oxidation stabilizer) at a temperature of 160° C. and a flow rate of 1.0 mL/min, thereby obtaining data. Then, the molecular weight of the polymer was calculated from a calibration curve based on the PS standard.

(2) DSC Data

Melting point (Tm) was measured at a heating rate of 15° C./min using a DSC.

(3) Tensile Test

Each polymer sample was pressed between two hot plates at 135° C. under a pressure of 5 MPa for 20 minutes and, then, under a constant pressure of 10 MPa for 100 minutes. Then, the resulting polymer film having a thickness of 1 mm was cut into four pieces (100×10 $mm^2$). Tensile testing was performed twice for each batch under conditions of a temperature of 25 (+2°) C, humidity of 45 (+5)%, a gauge length of 50 mm, and a crosshead speed of 500 mm/min using a UTM (WL2100) in accordance with ASTM D882. Each test piece was stretched to half of the elongation at break measured in tensile testing over 10 cycles or more.

<Evaluation Results>
(1) GPC Data

Figure 1:
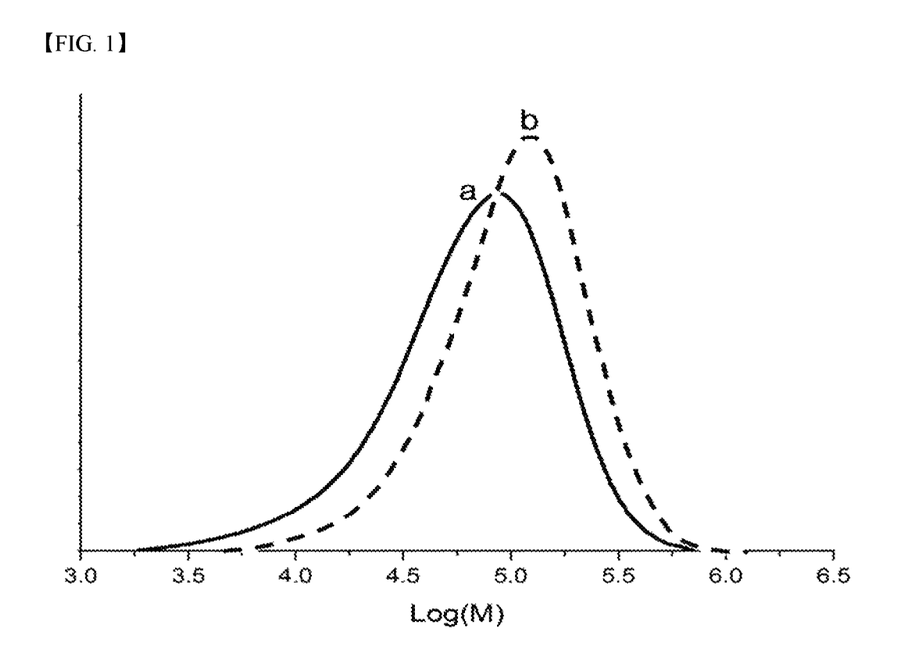
FIG. 1 is a graph showing results of GPC analysis of a tri-block polyolefin copolymer prepared in Example 1.

FIG. 1 shows GPC analysis graphs of the polymer prepared in Example 1 before (a) and after (b) treatment with lauroyl peroxide ($CH_3(CH_2)_{10}C(O)O$—$OC(O)(CH_2)_{10}CH_3$). It was confirmed that treatment with lauroyl peroxide ($CH_3(CH_2)_{10}C(O)O$—$OC(O)(CH_2)_{10}CH_3$) could increase the Mn value by 1.75 times. In the other Examples, it was confirmed that treatment with lauroyl peroxide ($CH_3(CH_2)_{10}C(O)O$—$OC(O)(CH_2)_{10}CH_3$) could increase the Mn value by 1.5 to 2 times. Therefore, it can be seen that formation of a C(sp3)-C(sp3) bond as observed in Experimental Examples is achieved through treatment with lauroyl peroxide, thereby allowing formation of the symmetrical polyolefin block copolymer represented by Formula 1.

(2) DSC Data

Figure 2:
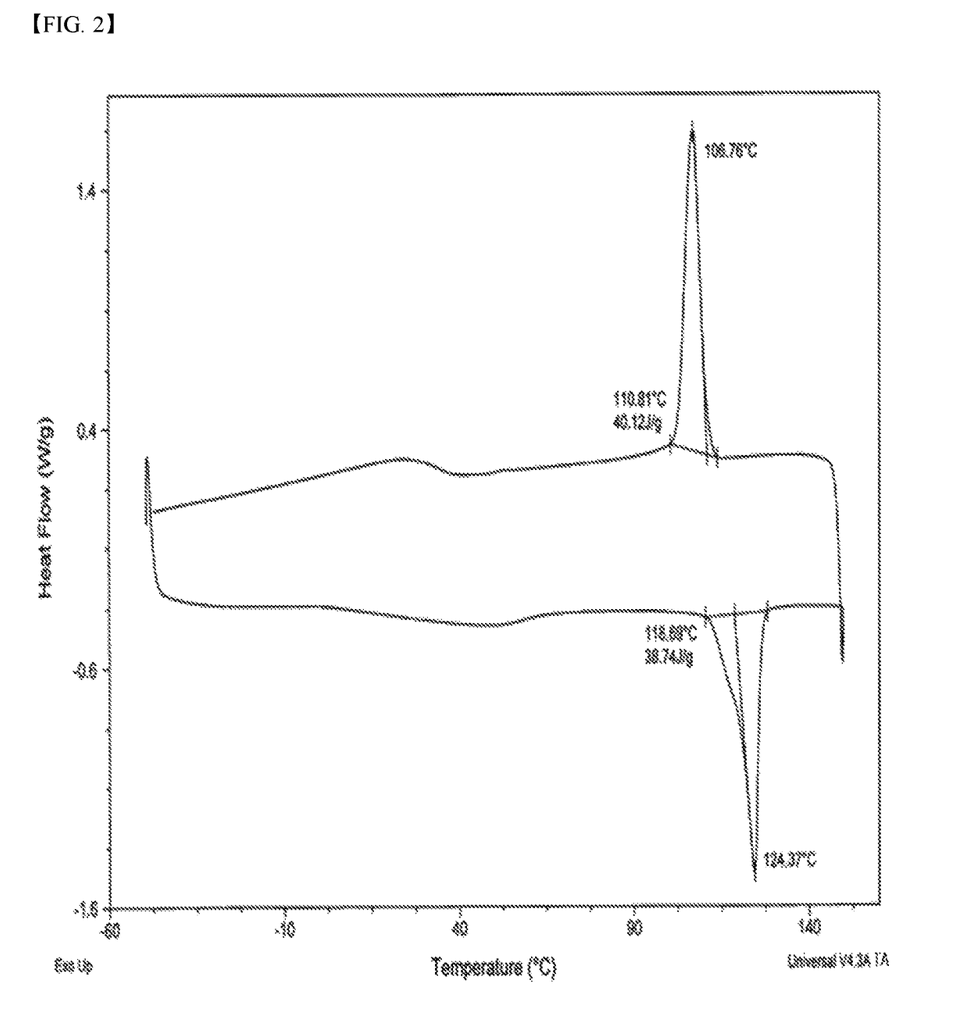
FIG. 2 is a graph showing results of DSC analysis of the tri-block polyolefin copolymer prepared in Example 1.

FIG. 2 is a graph showing DSC thermogram of the polyethylene-block-poly(ethylene-co-propylene)-block-polyethylene tri-block copolymer prepared in Example 1. Referring to FIG. 2, a Tm signal of a polyethylene block was observed at a temperature near 124° C. and a weak Tm signal of a poly(ethylene-co-propylene) block was observed in the temperature range of 0° C. and 60° C.

Although not shown, for the polypropylene-block-poly(ethylene-co-propylene)-block-polypropylene tri-block copolymers prepared in Examples 6 to 9, a Tm signal of a polypropylene block was observed at a temperature near 150° C.

(3) Tensile Test

TABLE 3

|  | Tensile strength (N/mm²) | Elongation (%) |
|---|---|---|
| Example 1 | 3.85 | 835 |
| Example 2 | 5.04 | 829 |
| Example 3 | 3.93 | 607 |
| Example 4 | 3.98 | 790 |
| Comparative Example 1 | 1.82 | 392 |
| Comparative Example 2 | 4.48 | 526 |
| Comparative Example 3 | 2.83 | 472 |
| Comparative Example 4 | 3.90 | 520 |

Table 3 shows results of the tensile test for the copolymers prepared in Examples 1 to 4 and Comparative Examples 1 to 4. From the results shown in Table 3, it could be seen that the symmetrical tri-block copolymers prepared in Examples exhibited greater tensile strength and much greater elongation than the asymmetrical di-block copolymers prepared in Comparative Examples.

(4) Cyclic Tensile Test

Figure 3:
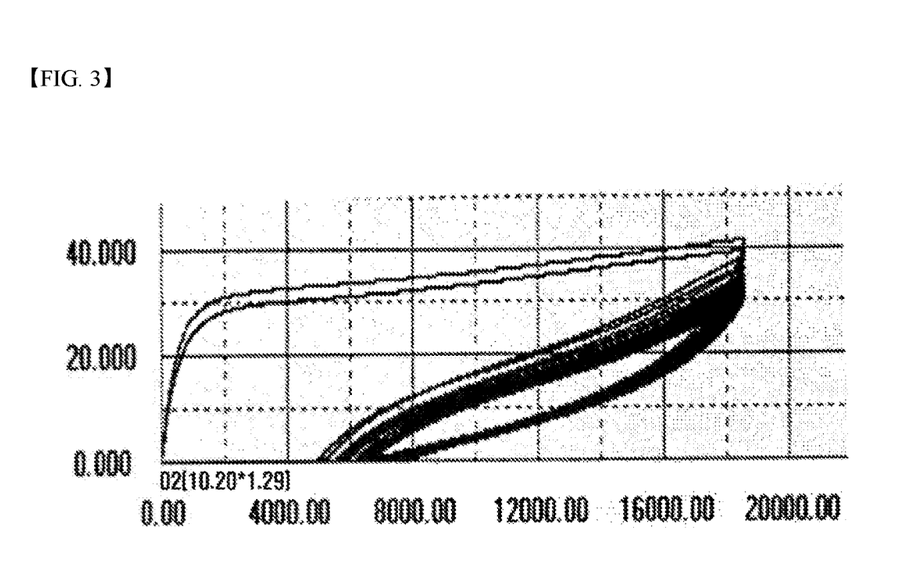
FIG. 3 is a graph showing results of a cyclic tensile test of the tri-block polyolefin copolymer prepared in Example 1.

FIG. 3 is a graph showing results of the cyclic tensile test for the polyethylene-block-poly(ethylene-co-propylene)-block-polyethylene tri-block copolymer prepared in Example 1. Referring to FIG. 3, it could be seen that the tri-block copolymer had elastomeric properties.

It should be understood that various modifications, changes, alterations, and equivalent embodiments can be made by those skilled in the art without departing from the spirit and scope of the invention.

The invention claimed is:

1. A method of preparing a polyolefin block copolymer represented by Formula 1, the method comprising:
    the first step in which a compound represented by Formula A is prepared by coordination polymerization of an olefin monomer using a transition metal catalyst in the presence of an organozinc compound represented by Formula A-1; and
    the second step in which a compound represented by Formula B-1 is added to and reacted with the compound represented by Formula A $(R^1)_2 Zn$      [Formula A-1]

$R^5 C(O)O\text{—}OC(O)R^5$      [Formula B-1]

[Formula 1]

wherein Formula A-1, Formula A, Formula B-1 and Formula 1, $R^1$ and $R^5$ are each independently a $C_1$ to $C_{20}$ hydrocarbyl group; $R^2$ to $R^4$ are each independently one selected from among hydrogen, a methyl group, an ethyl group, a butyl group, and a hexyl group; p and 1-p are mole fractions of sub-repeat units constituting a repeat unit b, respectively, p being greater than 0 and less than 1; a ranges from 50 to 5,000 on average or is 0; and b ranges from 50 to 5,000 on average.

2. The method according to claim 1, wherein the olefin monomer comprises at least two selected from among ethylene, propylene, 1-butene, 1-hexene, and 1-octene.

3. The method according to claim 2, wherein the first step comprises:
    introducing one selected from among ethylene, propylene, 1-butene, 1-hexene, and 1-octene as a first olefin monomer; and
    introducing the transition metal catalyst, followed by further introducing a mixture of at least two selected from among ethylene, propylene, 1-butene, 1-hexene, and 1-octene as a second olefin monomer.

4. The method according to claim 3, wherein the first olefin monomer is one selected from among ethylene, propylene, 1-butene, 1-hexene, and 1-octene, and the second olefin monomer is a mixture of ethylene and one selected from among propylene, 1-butene, 1-hexene, and 1-octene.

5. The method according to claim 4, wherein the first olefin monomer is propylene and the second olefin monomer is a mixture of propylene and ethylene.

6. The method according to claim 1, wherein a mole ratio of the organozinc compound represented by Formula A-1 to the compound represented by Formula B-1 ranges from 1:1 to 1:1.5.

* * * * *